2,977,280

PROCESS FOR TREATING FOOT ROT WITH QUATERNARY AMMONIUM COMPOUNDS

Bruce Adam Forsyth, Mitcham, Victoria, and Alan Stokoe Taylor, Croydon, Victoria, Australia, assignors to Imperial Chemical Industries of Australia and New Zealand Limited, Melbourne, Australia, a corporation of Australia No Drawing. Filed May 20, 1957, Ser. No. 660,030

Claims priority, application Australia May 30, 1956

5 Claims. (Cl. 167—53.2)

This invention relates to a treatment process and more particularly it relates to a process for the treatment of domestic animals for example sheep infected with footrot disease.

In the treatment of contagious footrot in sheep all overlying horn covering the infected tissues must be cut away before any form of treatment is applied. This treatment may then take the form of driving sheep through aqueous baths containing either formaldehyde or copper sulphate, or alternatively, painting the infected feet with an alcoholic solution of chloramphenicol.

These treatments are quite satisfactory providing the exposure of infected tissues has been adequate, but have disadvantages, such as staining of the wool, or irritant effects on the operators, or excessive cost.

It is accordingly the principal object of the present invention to provide an efficient treatment for footrot which is free from the above disadvantages.

Thus according to the present invention we provide a process for the treatment of domestic animals for example sheep infected with footrot disease which comprises applying to the said animals an effective amount of a quaternary ammonium cationic detergent and antiseptic.

As a suitable quaternary ammonium cationic detergent and antiseptic there may be mentioned for example hexadecyltrimethylammonium bromide especially in the form of cetrimide B.P. which contains hexadecyltrimethylammonium bromide together with related alkyltrimethylammonium bromides. Other suitable compounds which may be used as the quaternary ammonium cationic detergent and antiseptic are for example alkyldimethylbenzylammonium chlorides, p-octylphenyldiethoxydimethylbenzylammonium chloride, cetylpyridinium chloride, methylphenyldodecyltrimethylammonium methosulphate, dodecyldimethylphenoxyethylammonium bromide, octylphenoxyethyldiethylbenzylammonium chloride, and cetyldimethylcyclohexanolammonium bromide.

The quaternary ammonium compound may be applied to the animals in the form of a powder by dusting or in the form of an aqueous or alcoholic solution as a footbath. It is preferred however to apply the said quaternary ammonium compound as an aqueous or alcoholic solution preferably an alcoholic solution by painting the solution on to the infected feet after exposure of the infected tissue by paring. Furthermore preferred solutions to be applied to the said animals are those wherein for every 100 parts by weight of the said solution there is present between 10 parts by weight and 30 parts by weight of the said quaternary ammonium compound.

The alcoholic solutions to be applied to the said animals may be prepared from a lower alkyl alcohol for example methanol or ethanol and such alcoholic solutions may contain any proportion of water together with other known suitable diluents for example acetone or wood naphtha. Thus as a suitable alcohol there may be mentioned for example 95% alcohol B.P. or industrial methylated spirit B.P. comprising 19 volumes of 95% alcohol B.P. and 1 volume of wood naphtha.

A particularly valuable solution for application to the said animals may be formulated from 80 parts by weight of 95% alcohol B.P. or industrial methylated spirit B.P. and 20 parts by weight of cetrimide B.P. containing substantially hexadecyltrimethylammonium bromide and such a solution is highly effective in providing a high proportion of cures in infected sheep.

As a further feature of the invention we provide new veterinary compositions which are alcoholic solutions wherein for every 100 parts by weight of the said solution there is present between 10 parts by weight and 30 parts by weight of a quaternary ammonium cationic detergent and antiseptic.

It is to be understood that the alcoholic solutions of this feature of the invention are formed from a lower alkyl alcohol medium for example a methanol medium or an ethanol medium. It is further to be understood that the said alcohol may contain up to 40% v./v. of water together with small quantities of other known diluents for example acetone or wood naphtha. Thus as a suitable alcohol there may be mentioned for example 95% alcohol B.P. and industrial methylated spirit B.P. comprising 19 volumes of 95% alcohol B.P. and 1 volume of wood naphtha.

A particularly valuable solution is that formulated from 80 parts by weight of 95% alcohol B.P. or industrial methylated spirit B.P. and 20 parts by weight of cetrimide B.P. containing substantially hexadecyltrimethylammonium bromide. Such a solution is highly effective in providing a high proportion of cures in infected sheep.

The said veterinary compositions may be formulated by any means known to the art for example by admixture of the said quaternary ammonium cationic detergent and antiseptic with the suitable alcoholic medium until solution is complete.

As stated above, the said veterinary compositions are useful for the treatment of footrot in sheep. Thus the compositions may be applied to the sheep infected with footrot either as a footbath or preferably by painting on the feet after exposure of the infected tissue by paring.

The invention is illustrated but not limited by the following examples in which the parts are by weight:

Example 1

Twenty two feet of sheep suffering from footrot are pared to expose the infected tissues. These feet are then treated with a solution of 1 part of cetrimide B.P. in 80 parts of ethanol. After treatment the animals are housed in concrete pens to minimize the chances of re-infection. Ten days after treatment it is observed that a complete cure is obtained in nine (41%) of the treated feet.

To provide a basis for comparison, thirteen similarly infected feet are pared to expose the infected tissues and are treated with ethanol. After ten days only two (15%) of the treated feet are considered to be cured.

Example 2

Fourteen feet of sheep suffering from footrot are pared to expose the infected tissues. Each infected foot is then painted with a solution of 20 parts of cetrimide B.P. in 100 parts of water. The sheep are housed in concrete pens to minimise chance of re-infection. After seven days it is found that eleven (78%) of the treated feet are completely cured by this treatment while three (22%) of the feet although markedly improved, require further treatment to eliminate the infection.

Example 3

Thirteen feet of sheep kept in pens and suffering from footrot are pared to expose the infected tissues. The pared feet are then painted with a solution of 20 parts of cetrimide B.P. in 80 parts of ethanol. It is found that in each case there is a complete cure of the infected feet within 10 days and thus the described treatment is 100% effective.

*Example 4*

Forty-five feet of sheep suffering from footrot are pared to expose the infected tissues. Each foot is then painted with a solution of 20 parts of cetrimide B.P. in 100 parts of water. The animals are immediately placed in a paddock which has not been grazed for several weeks. These cases are well established chronic cases of the disease but when later inspected fourteen days after treatment, it is found that thirty-three (73%) of the treated feet have been cured by a single treatment. The remaining twelve feet, although not completely cured by this treatment, have markedly improved but further treatment is necessary before a cure is effected.

*Example 5*

Seventy feet of sheep infected with footrot are pared to expose the infected tissues. The pared feet are then treated with a solution of 20 parts of cetrimide B.P. in 80 parts of ethanol. As each sheep is treated, it is returned through extremely wet pastures to a paddock known to be infected with the causal organism. This imposes a severe test on the treatment as the medicament is not allowed to dry on the infected feet. These cases are well established chronic cases of the disease but when inspected ten days after treatment, it is found that forty-two feet (60% of those treated) have been cured by this single treatment.

Those feet which have not been completely cured are markedly improved and are retreated by the procedure as described above. When next inspected 10 days after the retreatment, it is found that a total of 94% of the cases have been cured after the second treatment.

We claim:

1. Process for the treatment of domestic animals infected with footrot disease which comprises applying to the said animals an effective amount of a quaternary ammonium cationic detergent and antiseptic as the essential agent for treating said disease, said agent being used in the form of an alcohol solution wherein for every 100 parts by weight of solution, there is present between 10 parts by weight and 30 parts by weight of said agent.

2. Process as claimed in claim 1 wherein the quaternary ammonium cationic detergent and antiseptic is selected from the group consisting of hexadecyltrimethylammonium bromide, an alkyldimethylbenzylammonium chloride, p-octylphenyldiethoxydimethylbenzylammonium chloride, cetlypyridinium chloride, methylphenyldodecyltrimethylammonium methosulphate, dodecyldimethylphenoxyethylammonium bromide, octylphenoxyethyldiethylbenzylammonium chloride and cetyldimethylcyclohexanolammonium bromide.

3. Process as claimed in claim 1 wherein the solution used is formulated from 80 parts of a member of the group consisting of 95% alcohol B.P. and industrial methylated spirit B.P. and 20 parts by weight of cetrimide B.P.

4. Process as claimed in claim 1 wherein the alcoholic solution comprises a lower alkyl alcohol.

5. Process as claimed in claim 4 wherein the alcoholic solution comprises a member of the group consisting of 95% alcohol B.P. and industrial methylated spirit B.P.

References Cited in the file of this patent

FOREIGN PATENTS 154,041    Australia _____ Nov. 9, 1953

OTHER REFERENCES

Forsyth: Australian Vet. Jour., vol. 29, No. 3, March 1953, pp. 73, 74.

Drug and Cos. Ind., vol. 70, No. 2, February 1952, p. 241.